United States Patent [19]

Nass

[11] Patent Number: 5,230,301
[45] Date of Patent: Jul. 27, 1993

[54] LABORATORY ANIMAL CONTROLLED ACCESS FEEDER

[76] Inventor: Thomas O. Nass, 14502 La Cuarta, Whittier, Calif. 90605

[21] Appl. No.: 936,785

[22] Filed: Aug. 28, 1992

[51] Int. Cl.⁵ .............................................. A01K 5/00
[52] U.S. Cl. .................................................... 119/52.1
[58] Field of Search .................... 119/52.1, 52.3, 52.4, 119/53.5, 54, 18, 902; 222/196, 459

[56] References Cited

U.S. PATENT DOCUMENTS

| | | | |
|---|---|---|---|
| 1,228,727 | 6/1917 | Wetzel, Jr. | 119/52.4 |
| 1,832,999 | 11/1931 | Rummell | 119/52.1 |
| 2,699,753 | 1/1955 | Poiley | 119/52.1 |
| 3,717,126 | 2/1973 | Falcone et al. | 119/52.4 |
| 3,776,190 | 12/1973 | Hurlbert | 119/18 |
| 4,355,598 | 10/1982 | Saylor | 119/52.1 |
| 4,384,547 | 5/1983 | Mattox | 119/18 |

Primary Examiner—Gene Mancene
Assistant Examiner—Thomas Price
Attorney, Agent, or Firm—Stetina & Brunda

[57] ABSTRACT

A laboratory animal controlled access feeder has a reservoir or hopper from which feed falls into a feed tray. The hopper is completely covered and access to the feed tray is limited to a small circular opening in order to mitigate the potential for contamination of the feed. The opening in the feed tray cover has a collar which extends downward to mitigate spillage of feed from the feed tray. Compaction of powder or granular feeds is substantially eliminated via a rake which is attached to the loosely attached lid of the feed tray and thus moves back and forth through the feed as the animal eats, thus continuously manipulating the feed and preventing compaction thereof.

7 Claims, 2 Drawing Sheets

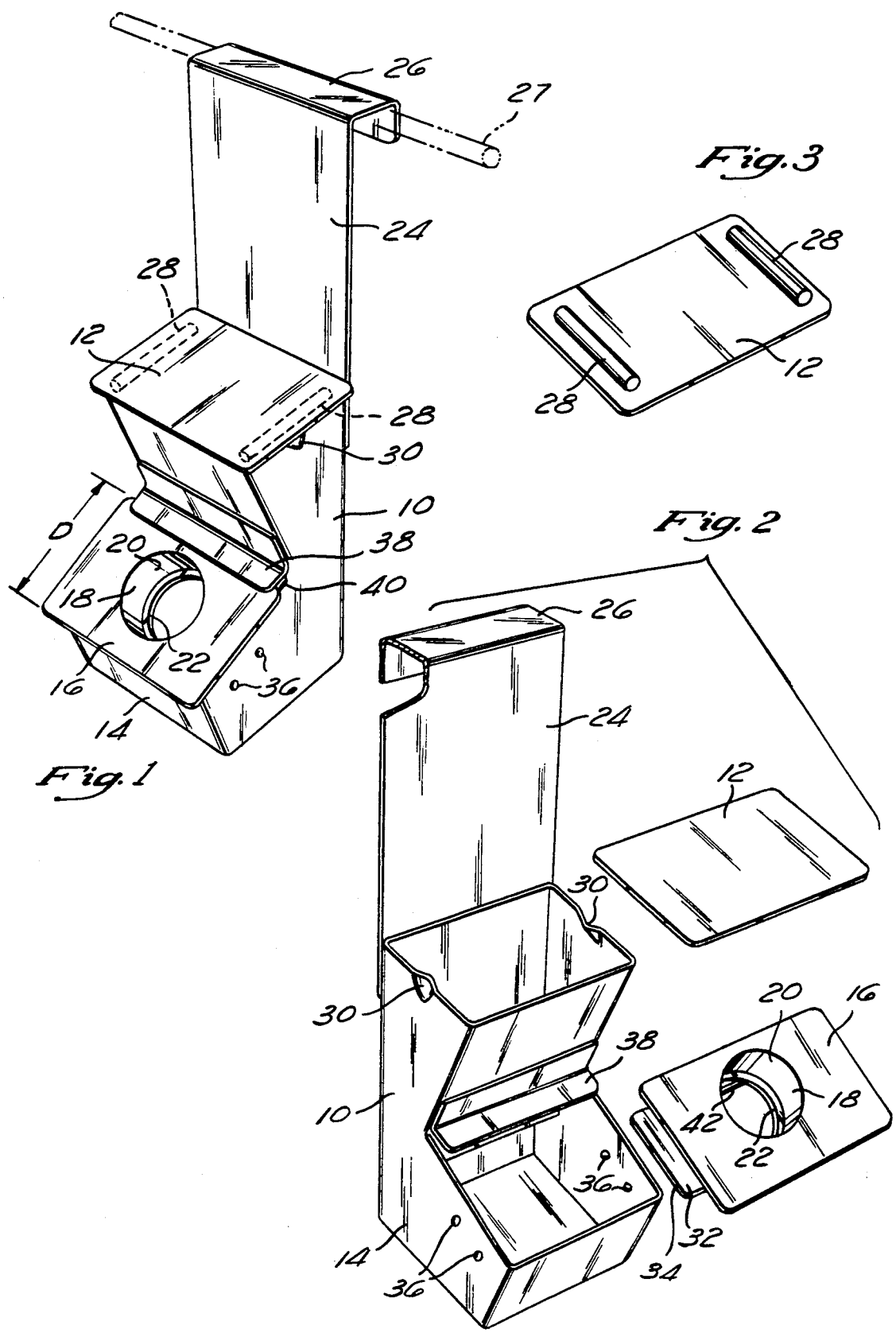

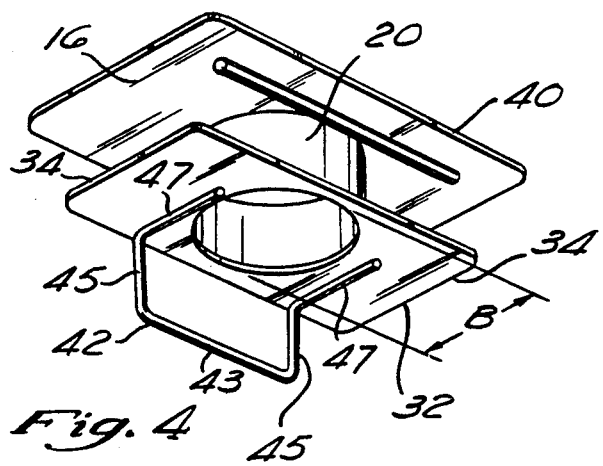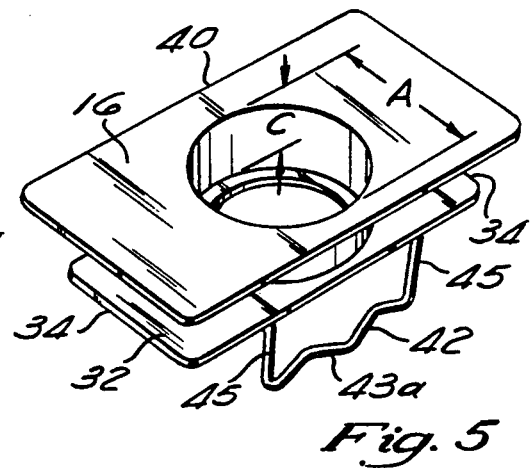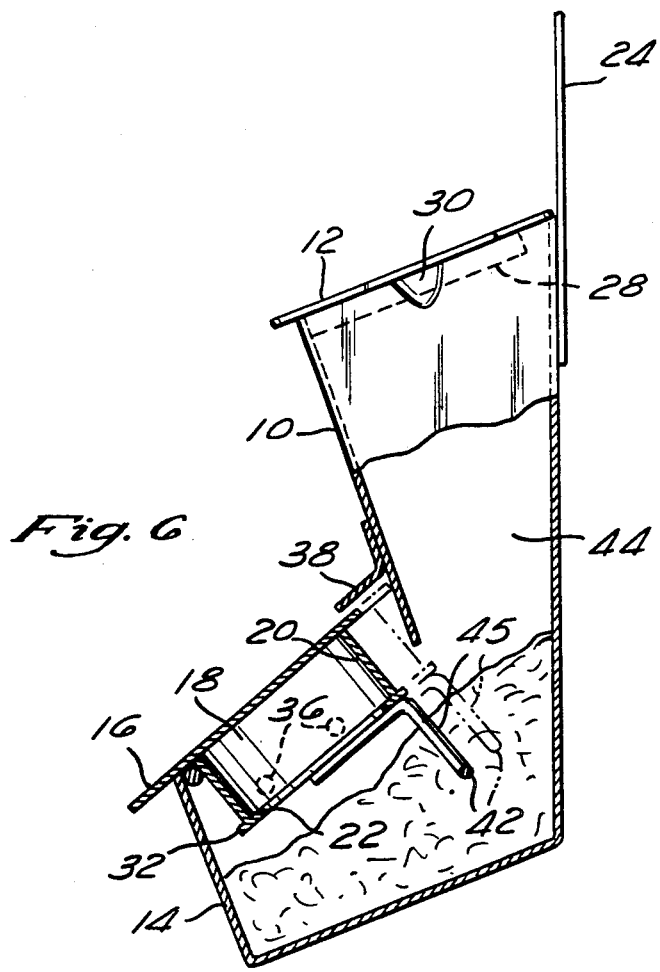

LABORATORY ANIMAL CONTROLLED ACCESS FEEDER

FIELD OF THE INVENTION

The present invention relates generally to devices used to feed laboratory animals, and more particularly to a laboratory animal controlled access feeder which limits spillage of the feed and which also mitigates undesirable compaction of the feed through the action of a rake which continuously moves through the feed during the feeding process.

BACKGROUND OF THE INVENTION

Feeders used in the care of laboratory animals are well known. Such feeders are typically configured in a hopper-like arrangement and attached to the side of an animal's cage. They typically have an upper opening for the addition of feed and a lower opening from which the laboratory animal can receive feed as desired. Thus, feed is placed in the feeder through the opening formed in the top thereof and is gravity fed to the lower opening, typically into a tray from which the animal feeds.

In laboratory testing environments, it is important to be sure that the food eaten by the laboratory animal does not become contaminated by urine, feces, or any other undesirable material. Such contaminants, when introduced into the food of a laboratory animal, may adversely affect or even invalidate the results of experiments in which substances are tested by mixing them with the laboratory animal's food. The validity of such experiments typically depends upon the purity and known content of the food provided to the laboratory animal.

Additionally, even when such test substances are not added to the food, contaminants may tend to adversely affect the life span and physical condition of the laboratory animal. This, in turn, becomes a particular problem when, as is the usual case, it is important to test laboratory animals which are in normal physical condition.

In large laboratory settings, where multiple cages are commonly stacked one on top of another, there is the possibility for urine, feces, dust, and other airborne contaminate to fall into the feeders of the lower cages and thereby contaminate the food. As such, it is desirable to provide a means for limiting the likelihood of the laboratory animal's food becoming contaminated.

Additionally, it is frequently desirable to know the amount of food consumed by a laboratory animal. Such is generally the case when the food contains a substance being tested. Thus, in order to know the amount of the substance being tested which is eaten by the laboratory animal, it is necessary to know how much of the laboratory animal's food has been consumed thereby. Spillage must be measured and accounted for such that it is not assumed to have been eaten by the laboratory animal. Thus, it is desirable to limit spillage and thereby reduce the amount of the food which must be measured in order to increase the accuracy and effectiveness of the test procedure.

Additionally, when granular or powder-like substances are fed to laboratory animals, such substances tend to cake up or compact due to the feeding action of the animal and the presence of moisture. Moisture, i.e. saliva, is typically contributed by the animal as it feeds, thus causing the feed to compact out of the reach of the animal's mouth. Such compaction generally results in the formation of a cone-shaped void about the animal's snout such that the remaining food is just out of reach.

As such, it is desirable to provide a laboratory animal feeder which mitigates the potential for contamination, limits spillage, and is not subject to compaction of the feed contained therein.

SUMMARY OF THE INVENTION

The present invention specifically addresses and alleviates the above-mentioned deficiencies associated in the prior art. More particularly, the present invention comprises a laboratory animal controlled access feeder having a reservoir or hopper from which food falls into a feed tray. The hopper is completely covered and access to the feed tray is limited to a small circular opening, in order to mitigate the potential for contamination of the food. This tends to prevent the introduction of undesirable material, i.e., urine, feces, etc., into the laboratory animal's food, and thus improves the validity and accuracy of any experiments which depend upon the purity of the laboratory animal's food.

The opening in the feed tray cover has a collar which extends downward to mitigate spillage of feed from the feed tray. This lessens the need to weigh spillage and thereby increases the reliability and accuracy of any experiments wherein the quantity of a substance consumed by the laboratory animal must be monitored.

Compaction of powder or granular feeds is substantially eliminated via a rake which is attached to the loosely attached lid of the feed tray and thus moves back and forth through the feed as the animal eats, thus continuously manipulating the feed. This permits the use of finer feeds which would otherwise tend to cake and thus be unsuitable for such use.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 1 is a perspective view of the laboratory animal feeder of the present invention having the hopper cover and feed tray cover in place thereon;

FIG. 2 is a perspective view of the laboratory animal feeder of FIG. 1 having the hopper cover and feed tray cover removed therefrom;

FIG. 3 is a perspective view of the hopper cover showing the underside thereof;

FIG. 4 is a perspective view of the feed tray cover showing the underside thereof;

FIG. 5 is a perspective view of the feed tray cover showing the top thereof; and FIG. 6 is a side view of the laboratory animal feeder of the present invention, partially in cross-section.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps for constructing and operating the invention in connection with the illustrated embodiment. It is to be understood, however, that the same or equivalent functions and sequences may be accomplished by different embodiments that are also intended to be encompassed within the spirit and scope of the invention.

The laboratory animal controlled access feeder of the present invention is illustrated in FIGS. 1 through 6 which depict a presently preferred embodiment of the invention. Referring now to FIGS. 1 through 6, the laboratory animal feeder of the present invention is comprised generally of a hopper section 10 into which feed may be poured, having a hopper cover 12, and a feed tray section 14 into which feed is gravity fed from the hopper 10. A feed tray cover 16 loosely fits upon the feed tray 14 and has a first opening 18 formed centrally therein. A collar 20 extends downwardly from the first opening 18 in the cover 16 and defines a second opening 22. The diameters of the first 18 and second 22 openings, as well as the length of the collar 20 are dependent upon the particular laboratory animal with which the laboratory feeder of the present invention is to be utilized.

In the preferred embodiment of the present invention, the first opening has a diameter A (best seen in FIG. 5) of approximately one inch, the second opening has a diameter B (best seen in FIG. 4) of approximately seven-eighths of an inch, and the collar has a length C (best shown in FIG. 5) of approximately one-half of an inch. These dimensions have been found to be suitable for use with small laboratory animals, such as mice, rats, other small rodents, and birds. Those skilled in the art will recognize that first openings, second openings, and collar lengths of various other sizes will be suitable for various other laboratory animals, i.e. rabbits, hamsters, guinea pigs, etc.

An elongate planar flange 24 extends upwardly from the hopper 10 and has a hook 26 formed thereon to facilitate attachment of the laboratory animal feeder to the side of a cage 27.

The hopper cover 12 comprises two detent members, preferably bars 28. The bars 28 of the hopper cover 12 engage inwardly bent detent tabs 30 to effectively detachably lock hopper cover 12 in place upon the hopper 10. Those skilled in the art will recognize that various other means for removably or openably attaching the hopper cover 12 to the hopper 10 are likewise suitable.

The feed tray cover 16 preferably has planar member 32 attached to the lower end of collar 20 such that the outboard ends 34 thereof engage inwardly convex dimples or detents 36 to similarly detachably lock the feed tray lid 16 in place upon the feed tray 14. Those skilled in the art will again recognize that various other means for removably or openably attaching the feed tray cover 16 to the feed tray 14 are likewise suitable. Flange 38 further secures the upper-most edge 40 of the feed tray cover 16 in place by limiting upward motion thereof. The feed tray cover 16 is free to move back and forth in direction as illustrated in FIG. 6.

With particular reference to FIGS. 4 and 5, wire form or rake 42 extends downwardly from planar member 32 of the feed tray cover 16 and thus moves a long therewith. As depicted in FIG. 4, the rake 42 preferably comprises lower horizontal member 43, vertically extending members 45 attached thereto, and horizontally extending members 47 attached to vertically extending members 45 and also attached to the planar member 32. Thus, the rake 42 may be formed of a single continuous piece of wire, bent as described. Those skilled in the art will recognize that various other configurations of the rake 42 are likewise suitable. An example of such other configurations is depicted in FIG. 5 wherein the rake 42 is formed having angled or serpentine portions 43a which serve to provide both lateral and central directional movement of feed controlled within the hopper 10.

Having thus described the structure of the laboratory animal feeder of the present invention, it may be beneficial to describe the operation thereof. With particular reference to FIG. 5, feed poured into the hopper 10 gravity feeds into the feed tray 14. In order to eat, a laboratory animal extends its snout down through first 18 and second 22 openings in the cover 16 of the laboratory animal feeder of the present invention. During the eating process, movement of the laboratory animal's snout effects similar movement of the feed tray cover 16 and thereby causes like movement of the rake 42 within the feed 44. This continual agitation of the feed 44 during the eating process assures continual and proper feeding of powdered and granular feeds from the hopper 10 into the feed tray 14 and prevents compaction of the feed due to the action of the animal's snout and the presence of moisture.

The hopper cover 12 and the feed tray cover 16 substantially reduce the amount of undesirable contaminants, i.e. feces, urine, dust, etc., entering the laboratory animal feeder and mixing with the feed therein. First 18 and second 22 openings in the feed tray cover are only large enough to permit feeding by the laboratory animal, thus reducing the size of the opening to the minimum feasible and consequently substantially mitigating the potential for contamination of the feed 44.

Such sizing of the first 18 and second 22 openings also reduces the amount of feed 44 which spills from the laboratory animal feeder of the present invention during the eating process. The use of collar 20 substantially enhances the spill-resistant feature of the present invention by substantially limiting the amount of feed 44 undesirably reaching the first 18 opening.

All components of the laboratory animal feeder of the present invention are preferably comprised of welded stainless steel. However, those skilled in the art will recognize that various other materials and fabrication techniques are likewise suitable.

It is understood that the exemplary laboratory animal feeder described herein and shown in the drawings represents only a presently preferred embodiment of the invention. Indeed, various modifications and additions may be made to such embodiment without departing from the spirit and scope of the invention. For example, the hopper 10 and feed tray 14 need not be configured as illustrated, but rather may be configured in any desired shape wherein each can be covered in the manner described or its equivalent. Also, various configurations of the wire form or rake 42 are contemplated. For example, the rake 42 may comprise a plurality of separate wires extending downwardly into the feed. Thus, these and other modifications and additions may be obvious to those skilled in the art and may be implemented to adapt the present invention for use in a variety of different applications.

What is claimed is:

1. A laboratory animal controlled access feeder comprising:
    a) a feed tray from which a laboratory animal eats;
    b) a cover loosely fitting upon said feed tray; and
    c) a rake fixedly attached to and extending downwardly from said feed tray cover such that motion of said rake during the feeding process prevents compaction of the feed.

2. The laboratory animal controlled access feeder as recited in claim 1 wherein said cover comprises a first opening sized no larger than required to facilitate feeding of the laboratory animal in order to mitigate spillage of food from the feed tray.

3. The laboratory animal controlled access feeder as recited in claim 2 further comprising a collar extending downwardly from said first opening and having a second opening formed therein.

4. The laboratory animal controlled access feeder as recited in claim 3 wherein said second opening is sized smaller than said first opening.

5. The laboratory animal controlled access feeder as recited in claim 4 wherein:
 a) said first opening has a diameter of approximately one inch;
 b) said second opening has a diameter of approximately seven-eighths of an inch; and
 c) said collar has a length of approximately one-half inch.

6. The laboratory animal controlled access feeder as recited in claim 5 further comprising a hopper disposed above said feed tray from which food moves downwardly into said feed tray.

7. The laboratory animal controlled access feeder as recited in claim 6 further comprising a cover covering said hopper.

* * * * *